United States Patent [19]  
Saslow

[11] 3,911,351  
[45] Oct. 7, 1975

[54] BATTERY CHARGING PROTECTIVE CIRCUIT FOR USE IN CHARGING NICKEL CADMIUM BATTERIES

[75] Inventor: Seymour Saslow, Saratoga Springs, N.Y.

[73] Assignee: Espey Mfg. & Electronics Corporation, Saratoga Springs, N.Y.

[22] Filed: Apr. 8, 1974

[21] Appl. No.: 458,782

[52] U.S. Cl.................................. 320/39; 320/35
[51] Int. Cl.² ........................................ H02J 7/10
[58] Field of Search ............... 320/2, 23, 35, 36, 39

[56] References Cited  
UNITED STATES PATENTS 2,022,874  12/1935  West .................................. 320/35
3,310,724  3/1967  Grafham ............................. 320/39
3,626,270  12/1971  Burkett et al. ..................... 320/35

Primary Examiner—J. D. Miller  
Assistant Examiner—Robert J. Hickey  
Attorney, Agent, or Firm—George B. Oujevolk

[57] ABSTRACT

The present invention contemplates to control battery charge as a function of temperature but without employing any additional connections to the battery. The same two connections are used to give temperature information as well as voltage state. Also, two SCRs can be used, the first SCR is used to charge the battery while the second SCR will turn off the charging when a predetermined charge point is reached.

1 Claim, 3 Drawing Figures

BATTERY CHARGING PROTECTIVE CIRCUIT FOR USE IN CHARGING NICKEL CADMIUM BATTERIES

BACKGROUND OF THE INVENTION

The present invention relates to a battery charging protective circuit and more particularly to a circuit useful in charging nickel cadmium batteries.

BRIEF REVIEW OF THE PRIOR ART

In U.S. Pat. No. 3,733,534 there is described a battery charging arrangement which has been found useful in charging nickel cadmium batteries. In that arrangement, use is made of constant current pulsed charging with battery voltage interrogation during the interpulse period. The rise in terminal EMF is used as a control signal for the state of charge and a capacitive storage circuit is used to program the overcharge. A thermal fuse at the battery in series with the charging circuit is used to protect against malfunction since sealed Nickel Cadmium batteries do not exhibit a marked rising voltage characteristic.

If the predetermined voltage sensing point is missed and high rate charging persists, it will cause the temperature of the battery to rise and may cause the battery seal to fail. The thermal fuse is used to guard against this condition. Should it happen, the fuse will open the circuit and prevent the battery from being further rapid charged, however, the battery can still be trickle or float charged and discharged.

During battery charging, a rise in voltage occurs at about the time when 90% of the energy is restored. There is no appreciable change in battery temperature until in excess of 110% of the capacity is returned to the battery. According to some charging arrangements now in use, a third connection between the battery and the charger is used to sense temperature and some systems program the charge as a function of battery temperature.

SUMMARY OF THE INVENTION

Generally speaking, the present invention contemplates to control battery charge as a function of temperature but without employing any additional connections to the battery. The same two connections are used to give temperature information as well as voltage state. Also, two SCRs can be used, the first SCR is used to charge the battery while the second SCR will turn off the charging when a predetermined charge point is reached.

The invention, as well as other objects and advantages thereof will be better understood from the following detailed description when taken together with the accompanying drawings, in which:

FIG. 1 is a schematic diagram of the prior art;
FIG. 2 is a schematic diagram of the inventive concept; and,
FIG. 3 is a more detailed schematic explanation and drawing of the invention.

DETAILED DESCRIPTION

Figure 1:
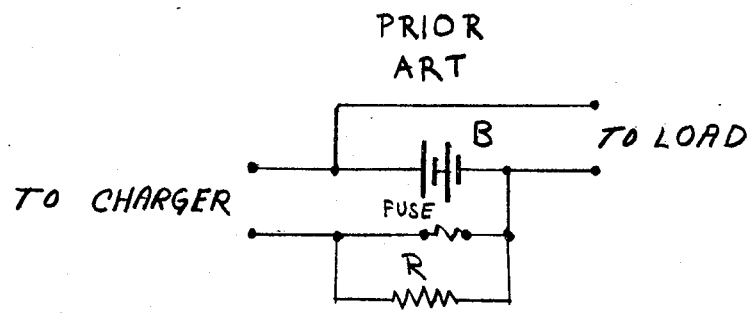
Figure 2:
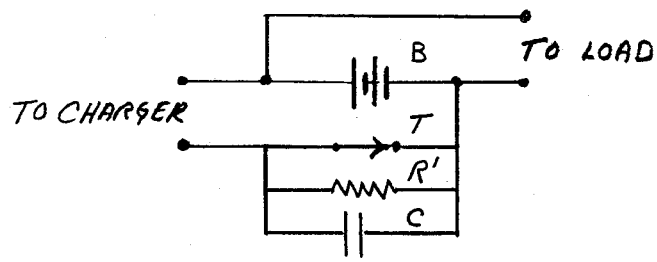

Shown in FIG. 1 is a battery charging circuit of the prior art. In this circuit there are shown the charger terminals for battery B, the load terminals and a fuse F in parallel with a resistor R both in series with battery B and one of the charger terminals. According to the present inventive concept as shown in FIG. 2, the thermal fuse F has been replaced with a thermostat T that is in thermal contact with the battery B. A resistor R' and capacitor C are arranged across the thermostat T. If the battery voltage did not rise sufficiently to indicate the state of charge, high rate charging would persist and the temperature of the battery would rise. When the control setting of the thermostat was reached it would open circuit causing current to flow through the resistor and also developing a charge on the capacitor. During the interpulse period when voltage is being viewed the voltage developed and stored on the capacitor is added algebraically to the cell voltage and the charger responds as though it had arrived at the voltage sensing point and proceeds to terminate the high rate charge cycle. The thermostat closure when the battery has cooled off has no effect on the circuit since it has latched over to the float mode. A high rate charge cannot initiate unless the battery is first disconnected from the charger. The foregoing describes the temperature sensing technique contemplated by our present invention. Thus, according to the inventive concept, a source of direct current is applied to the battery while its terminal voltage is being measured and compared to a reference voltage. The D. C. source is so disposed as to shut down when the preset voltage level is reached, and stay latched in the shut down condition until the battery is disconnected from the charger. The battery contains a thermostat T (N.C.) a resistor connected in parallel with the thermostat and capacitor C across the resistor. The resistor is chosen to allow float current to flow through the battery.

Figure 3:
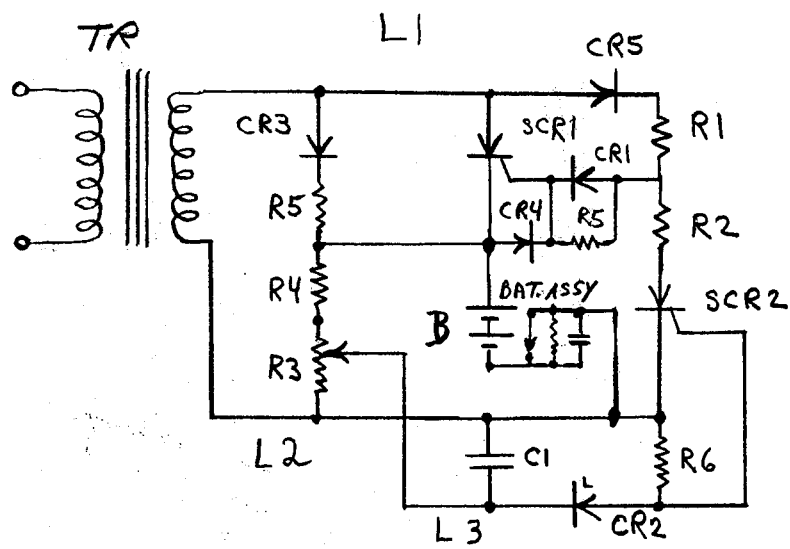

Shown in FIG. 3 is a transformer TR with terminal leads L1 and L2 an input side in parallel with transformer TR having a diode CR3 and resistors R5, R4 and potentiometer R3 in series with diode CR3. In a series with lead L1 is a silicon controlled rectifier SCR1 with a base diode CR5 and resistor R1, CR1. and a gate control diode CR1, SCR1 feeds the battery. Resistor R2 is connected to a second silicon controled rectifier SCR2 which is also fed by the battery across diode CR4 and resistor R5 is the "turn off" key. Potentiometer R3 has a lead L3 going to the gate control of SCR2 and leads L2 and L3 form parallel lines for capacitor C1 and resistor R6, in series with capacitor C1 and resistor R6 in lead L3 is a diode CR2. C1, CR2 and R6 act as a ripple filter to trigger the control electrode of SCR2.

THE CIRCUIT OPERATION

In the circuit shown in FIG. 3, the transformer secondary forms a series circuit with SCR1, and the battery being charged. Gate current is supplied to SCR1 via diodes CR5 and CR1 during positive ½ cycles of the input line causing ½ wave recitified current to flow through the battery. If this gate current is stopped, the charging process is stopped. Meanwhile, D. C. pulses are also flowing through diode CR3, resistors R5, R4 and sensed and picked off by potentiometer R3 feeding gate current to SCR2. During negative half cycles i.e. when SCR1 does not feed the battery, current flows out from the battery through resistor R4 and potentiometer R3 to the gate electrode of SCR2.

With low battery voltage SCR2 does not fire, SCR1 is gated on each cycle via CR1 and R1 and charging current flows to the battery. Eventually as the battery charges up and when the sampled voltage from potentiometer R3 exceeds the reference voltage at which SCR2 will fire. SCR2 is unable to turn off once it has been fired as it is provided by continuous hold current from the battery via diode CR4 and resistor R5. With SCR2 on continuously SCR1 cannot be re-triggered and charging stops. To reset, the battery must be removed from the charger. The same circuit can also be used with full wave charging.

By adjustment of the reference voltage and also using the circuit shown in FIG. 2 the charger can be programmed to respond to the temperature function only thus providing a means for rapid charging of the battery to full charge base primarily on the battery temperature which is a very reliable indicator of charge status without any additional connections to the battery.

I claim:

1. In a battery charging circuit having a transformer, an SCR trigger means coupled to said transformer, a first silicon controled rectifier (SCR1), fed by said transformer and a battery charging side coupleing said first silicon controled rectifier (SCR1) to a battery to charge the battery; a second silicon controled rectifier (SCR2) fed by said battery charging side and a resistor (R5) with a diode (CR4) in series with said battery, said second silicon controled rectifier (SCR2) being connected to said trigger means inhibiting the firing of said trigger circuit after a predetermined charge lever is reached the improvement therein which comprises having first and second battery charging leads, and, in parallel in one of said leads a thermostat (T), a resistor (R') and a capacitor (C) whereby at a predetermined temperature said thermostat will open said lead.

* * * * *